No. 826,273.
PATENTED JULY 17, 1906.
J. H. RACKERBY.
GRAVITY LEVEL.
APPLICATION FILED JAN. 2, 1906.
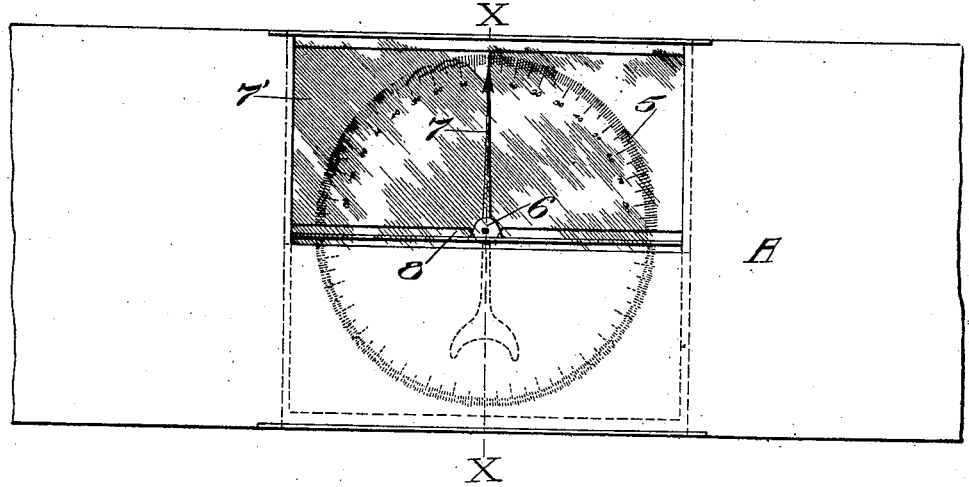
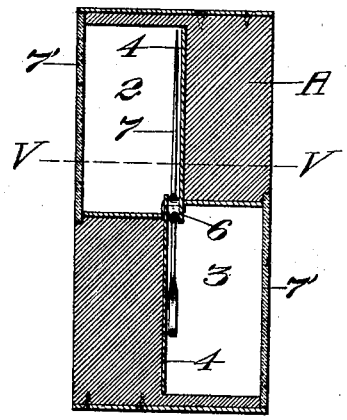
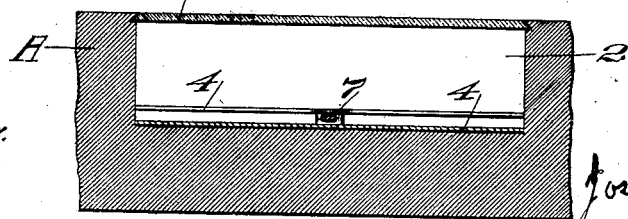
Witnesses:
Inventor:
Joseph H. Rackerby
By Geo. H. Strong Atty.
THE NORRIS PETERS CO., WASHINGTON, D. C.

UNITED STATES PATENT OFFICE.

JOSEPH H. RACKERBY, OF TRINITY CENTER, CALIFORNIA, ASSIGNOR OF ONE-HALF TO F. R. GIDDINGS, OF TRINITY CENTER, CALIFORNIA.

GRAVITY-LEVEL.

No. 826,273.  Specification of Letters Patent.  Patented July 17, 1906.

Application filed January 2, 1906. Serial No. 294,164.

*To all whom it may concern:*

Be it known that I, JOSEPH HENRY RACKERBY, a citizen of the United States, residing at Trinity Center, in the county of Trinity and State of California, have invented new and useful Improvements in Gravity-Levels, of which the following is a specification.

My invention relates to levels such as are employed by carpenters, machinists, miners, and others. Its object is to provide a cheap, simple, sensitive, practical, and durable substitute for "spirit-levels" in which a gravity-actuated pointer adapted always to hang plumb will take the place of the usual fragile spirit-filled glass.

The invention consists of the parts and the construction and the combination of parts, as hereinafter more fully described and claimed, having reference to the accompanying drawings, in which—

Figure 1 is a front elevation of my invention. Fig. 2 is a section on line X X, Fig. 1. Fig. 3 is a plan section on line V V of Fig. 2.

A represents a straight-edge bar of any suitable size, shape, and material. This bar is mortised out at some convenient point in its length on two sides, as shown at 2 3. These mortises are symmetrical and interdependent in so far that one mortise is to one side of the longitudinal central line of the bar and the other mortise is to the other side of said line, and the combined depth of the two mortises is greater than the thickness of the bar, so that the two mortises run into one another at their adjacent angles.

Plates 4, having corresponding graduations 5, are secured in the bottom of each mortise. The two graduated plates have perforated projections 6 on their adjacent edges to provide bearings for the pintles of the counterweighted pointer 7, which swings in the space between the parallel planes of the plates 4. The pointer may be protected by the glass plates 7'. The adjustment and finish of the parts are such that the pointer will always hang plumb no matter which edge of the bar A is uppermost or at what incline the bar may be held or set.

The arrangement of the mortises and plates 4 is such that the adjacent edges of the plates 4 and the corresponding walls of the mortises lie in slightly-spaced parallel planes which are perpendicular to the plates, thereby leaving a space or narrow slit 8 running lengthwise of the bar and parallel with the longitudinal straight edges. This slit 8 provides a proper sight-line to gage the pointer by when the bar A is held vertical.

Having the graduation 5 in conjunction with the gravity-actuated pointer adapts the device for determining inclinations from a true horizontal or vertical and renders the level particularly useful to miners and also to carpenters for laying off and cutting angles. As the pointer is free to swing through a complete circle in either direction and as it is viewable from either side, it renders the level reversible and makes it immaterial to the workman which edge of the level is uppermost. With the pointer housed in the mortises, as shown, it is amply protected from injury by ordinary usage.

It is possible that various modifications in my invention may be made without departing from the principle thereof, and I do not wish to be understood as limiting myself to my specific construction beyond what is required by a reasonable interpretation of my claims.

Having thus described my invention, what I claim, and desire to secure by Letters Patent, is—

1. A level comprising a bar mortised on opposite sides of its center said mortises overlapping and connecting at their adjacent inner angles, and a gravity-actuated pointer pivotally hung between the overlapping portions of the mortises and normally hanging vertical.

2. A level comprising a bar having mortises on opposite sides of its center said mortises having their adjacent inner angles overlapping, a gravity-actuated pointer pivotally hung between said overlapping portions of the mortises and capable of swinging through a complete circle, and plates having graduations over which the pointer operates.

3. In a level, the combination of a bar correspondingly mortised on its opposite sides, one of said mortises arranged mainly above the longitudinally-central line of the bar, and the other mortise arranged mainly below said central line, said mortises running into one another, and a gravity-actuated pointer fulcrumed at the adjacent angles formed by said mortises.

4. In a level, the combination of a bar correspondingly mortised on its opposite sides, one of said mortises arranged mainly above the longitudinally-central line of said bar, and the other mortise arranged mainly below said central line, said mortises running into one another, a gravity-actuated pointer fulcrumed between the planes of the bottoms of the mortises, and plates in the bottom of the mortises having adjacent projections to form bearings for the pintles of the pointer.

5. In a level, the combination of a bar correspondingly mortised on its opposite sides, one of said mortises arranged mainly above the longitudinally-central line of the bar, and the other mortise arranged mainly below said central line, said mortises running into one another, a gravity-actuated pointer fulcrumed between the planes of the bottoms of the mortises, and graduated plates in the bottom of the mortises having adjacent projections to form bearings for the pintles of the pointer.

In testimony whereof I have hereunto set my hand in presence of two subscribing witnesses.

JOSEPH H. RACKERBY.

Witnesses:
S. H. NOURSE,
E. O. JONES.